(12) United States Patent
Royal (10) Patent No.: US 12,363,174 B2
(45) Date of Patent: *Jul. 15, 2025

(54) CLOUD-BASED SECURITY SERVICE THAT INCLUDES EXTERNAL EVALUATION FOR ACCESSING A THIRD-PARTY APPLICATION

(71) Applicant: CLOUDFLARE, INC., San Francisco, CA (US)

(72) Inventor: James Howard Royal, Austin, TX (US)

(73) Assignee: CLOUDFLARE, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/527,887

(22) Filed: Dec. 4, 2023

(65) Prior Publication Data

US 2024/0106864 A1    Mar. 28, 2024

Related U.S. Application Data

(63) Continuation of application No. 17/936,572, filed on Sep. 29, 2022, now Pat. No. 11,838,327.

(60) Provisional application No. 63/366,686, filed on Jun. 20, 2022.

(51) Int. Cl.
   *H04L 9/40* (2022.01)
(52) U.S. Cl.
   CPC .......... *H04L 63/20* (2013.01); *H04L 63/0807* (2013.01); *H04L 63/102* (2013.01)

(58) Field of Classification Search
   CPC .... H04L 63/20; H04L 63/0807; H04L 63/102
   See application file for complete search history.

(56) References Cited

U.S. PATENT DOCUMENTS

| 8,806,570 | B2 |   | 8/2014 | Barton et al. |
|---|---|---|---|---|
| 9,143,509 | B2 | * | 9/2015 | Rose ........................ G06F 21/74 |
| 10,771,435 | B2 | * | 9/2020 | Goldschlag ......... H04L 63/0478 |
| 10,944,561 | B1 | * | 3/2021 | Cahill ................... H04L 9/3213 |

(Continued)

OTHER PUBLICATIONS

Cloudflare One, Our SASE Platform, Design Guide, Cloudflare Inc., Jan. 13, 2022, 26 pages.

(Continued)

*Primary Examiner* — Khoi V Le
(74) *Attorney, Agent, or Firm* — NICHOLSON DE VOS WEBSTER & ELLIOTT LLP (57) ABSTRACT

A cloud-based security service that includes external evaluation for accessing a third-party application. The security service receives a request to access a third-party application from a client device. The security service enforces a set of one or more access policies configured for the third-party application including an external evaluation rule. As part of enforcing the external evaluation rule, the security service transmits an external evaluation request to an external endpoint defined in the external evaluation rule. The external evaluation request includes an identity of a user associated with the request. The security service receives the result of the external evaluation. If the external evaluation passed, the security service grants access to the third-party application based at least in part on its passing.

17 Claims, 4 Drawing Sheets

(56) References Cited

U.S. PATENT DOCUMENTS

| | | | | |
|---|---|---|---|---|
| 2014/0040977 A1* | 2/2014 | Barton | ................. | H04W 12/37 |
| | | | | 726/1 |
| 2016/0269416 A1* | 9/2016 | Camenisch | ........... | H04L 63/126 |
| 2021/0200870 A1* | 7/2021 | Yavo | ................... | H04L 63/1416 |

OTHER PUBLICATIONS

Final Office Action, U.S. Appl. No. 17/936,572, Apr. 25, 2023, 12 pages.
Garbers, et al., Zero Trust, SASE and SSE: Foundational Concepts for Your Next-Generation Network, Cloudflare, Inc., Jun. 19, 2022, 18 pages.
Non-Final Office Action, U.S. Appl. No. 17/936,572, Dec. 8, 2022, 9 pages.
Notice of Allowance, U.S. Appl. No. 17/936,572, Jul. 20, 2023, 9 pages.

* cited by examiner

FIG. 4

CLOUD-BASED SECURITY SERVICE THAT INCLUDES EXTERNAL EVALUATION FOR ACCESSING A THIRD-PARTY APPLICATION

CROSS-REFERENCE TO RELATED APPLICATIONS

This application is a continuation of U.S. application Ser. No. 17/936,572, filed Sep. 29, 2022, which claims the benefit of U.S. Provisional Application No. 63/366,686, filed Jun. 20, 2022, which is hereby incorporated by reference.

FIELD

Embodiments of the invention relate to the field of network security; and more specifically, to a cloud-based security service that includes external evaluation for accessing a third-party application.

BACKGROUND

In a "zero trust" application security environment, every request to the application is denied unless the request passes a specific set of defined security policies. Commonly, these solutions allow the use of a user's identity (e.g., email address), device, and location as variables to define these security policies. When a request is received, the request and/or device is evaluated for compliance with these specific set of defined security policies. If the request and/or device does not meet these policies, the request is denied. If the request and/or device meets these policies, the request to the application is allowed.

SUMMARY

A cloud-based security service that includes external evaluation for accessing a third-party application. The security service receives a request to access a third-party application from a client device. The security service enforces a set of one or more access policies configured for the third-party application including an external evaluation rule. As part of enforcing the external evaluation rule, the security service transmits an external evaluation request to an external endpoint defined in the external evaluation rule. The external evaluation request includes an identity of a user associated with the request. The security service receives the result of the external evaluation. If the external evaluation passed, the security service grants access to the third-party application based at least in part on its passing. If the external evaluation failed, the security service denies access to the third-party application or takes other action.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A cloud-based security service that includes external evaluation for accessing a third-party application is described. A cloud-based security service enforces a set of one or more access policies for a third-party application such as a website or resource. A user and/or device must meet the criteria defined in the set of access policies to access the third-party application. An access policy may include identity-based access rules and/or non-identity based access rules. The set of access policies includes an access policy that includes an external evaluation rule. The external evaluation rule may be configured and/or customized by the operator of the third-party application. The external evaluation rule defines an external endpoint (e.g., an external Application Programming Interface (API)) controlled or managed by the owner or operator of the third-party application. When the external evaluation rule is triggered, the cloud-based security service transmits a request for an external evaluation to the external endpoint for the user and/or device. This request is sometimes referred herein as an external evaluation request. The external evaluation request may include information known about the following: the identity of the user associated with the access request, the device making the access request, the access request itself, a location of the device making the request, time of the access request, and/or other information.

The external endpoint receives the external evaluation request and performs an access evaluation based on its own access rules that are configured and/or customized by the operator of the third-party application. Example external access rules include checking whether the requesting device is compliant according to an endpoint protection provider, checking whether the IP address used in the request is not on an external threat feed, checking whether the identified user is on a user database (e.g., is the user on a list of users that have completed cybersecurity training), checking for approval from another user of the organization, and/or checking whether the request is from a user authorized to access the application at the time of the request. The external server returns a response (sometimes referred herein as an external evaluation response) to the cloud-based security service that specifies whether the external access evaluation passed or failed.

If the external evaluation response specifies that the external access evaluation passed, and any other access policy is passed, the cloud-based security service allows access to the third-party application. If the external evaluation response specifies that the external access evaluation failed, the cloud-based security service denies access to the third-party application in an embodiment. In another embodiment, if the external evaluation response specifies that the external access evaluation failed, the cloud-based security service takes one or more actions including allowing access to the third-party application but in a remote browser isolation session, enforcing a set of one or more other access policies to determine whether access to the third-party application will be allowed, and/or triggering a purpose justification or temporary authentication for the user to submit for allowing access to the third-party application.

Figure 1:
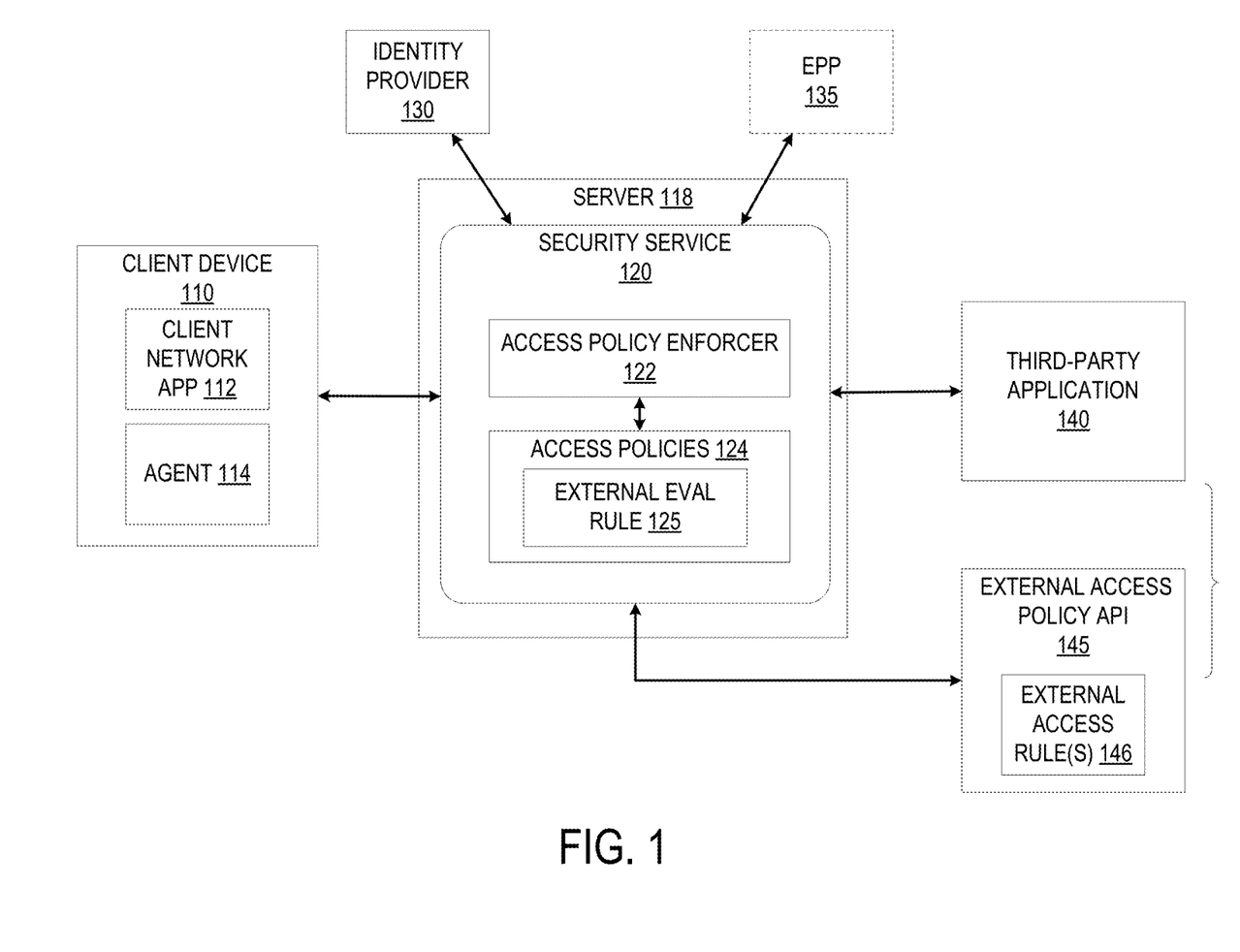
FIG. 1 shows an example system for a cloud-based security service that includes external evaluation for accessing a third-party application according to an embodiment.

FIG. 1 shows an example system for a cloud-based security service that includes external evaluation for accessing a third-party application according to an embodiment. The system includes a client device 110, the cloud-based security service 120 (sometimes referred herein as the security service 120), the identity provider 130, the endpoint protection provider (EPP) 135, the third-party application 140, and the external access policy API 145.

The client device 110 is a computing device (e.g., laptop, desktop, smartphone, mobile phone, tablet, gaming system, set top box, internet-of-things (IoT) device, wearable device, or another network device) that can transmit and receive network traffic. The client device 110 executes a client network application 112 such as a web browser or other application that can access network resources. The client device 110 may include an agent 114 that securely connects to the cloud-based security service 120. For instance, the agent 114 may establish a tunnel connection (e.g., a VPN connection) with a server 118 implementing the security service 120 and intercept all outgoing internet traffic or a defined subset of traffic and transmit the traffic over the tunnel to the server 118. The tunnel connection may be a WireGuard point-to-point tunnel or another secure tunnel such as TLS, IPsec, or HTTP/2. The agent 114 may be configured to transmit identity information of the user of the client device (e.g., an email address, a unique device identifier, a unique identifier tied to the agent, an organization identifier to which the user belongs, etc.) to the security service 120.

The security service 120 may execute on one or more servers such as the server 118 and be part of a cloud computing network that includes multiple data centers that each include multiple servers respectively. Each of these servers and/or data centers may execute an instance of the security service 120. The security service 120 includes the access policy enforcer 122 that enforces a set of one or more access policies 124 for accessing the third-party application 140. The third-party application 140 may be a website or other application that is protected by the security service 120.

In an embodiment, all traffic to the third-party application 140 may be received and evaluated by the security service 120 before being transmitted to the third-party application 140. Traffic that is for the third-party application 140 can be received at the security service 120 in different ways. For example, in one way, the traffic is received at the security service 120 because a domain of the third-party application 140 resolves to an IP address of the security service 120 instead of the third-party application. In another example, the traffic is received at the security service 120 because the security service 120 advertises the IP address of the third-party application 140. As another example, the client device 110 may have an agent 114 that intercepts all outgoing internet traffic or a defined subset of traffic and transmit the traffic over a tunnel to the security service 120. As another example, all traffic from and to the client device 110 may traverse a router that has a GRE tunnel or IPsec tunnel to the security service 120 such that all traffic from and to the client device 110 goes through the security service 120. As another example, the client device may transmit traffic to the security service 120 due to a proxy auto-configuration (PAC) file that specifies that traffic is to be transmitted to the security service 120.

The set of access policies 124 may be configured and/or customized by an operator of the third-party application 140. The set of access policies 124 define criteria that a user of the client device 110 and/or the client device 110 itself must meet to access the third-party application 140. As an example, an access policy includes an action (e.g., allow, block, alert), rule types (e.g., include, exclude, require), a rule selector that defines the criteria for users/devices to meet, and value(s). An access policy may include identity-based access rules and/or non-identity based access rules. An identity-based access rule is based on the identity information associated with the user making the request (e.g., username, email address, etc.). Example rule selectors that are identity-based include access groups, email address, and emails ending in a specified domain. For instance, an identity-based access rule may define email addresses or groups of email addresses (e.g., all emails ending in @example.com) that are allowed and/or not allowed. A non-identity based access rule is a rule that is not based on identity. Examples include rules based on location (e.g., geographic region such as the country of origin), device posture, time of request, type of request, IP address, multi-factor authentication status, multifactor authentication type, type of device, type of client network application, whether the request is associated with an agent on the client device, an external evaluation rule, and/or other layer 3, layer 4, and/or layer 7 policies.

To determine identity of the user, the security service 120 may cause the client device 110 to authenticate and prove identity with the identity provider 130. The identity provider 130 may be a separate organization from the organization operating the security service 120 or may be an internal identity provider to the security service 120. If, for example, a request to access the third-party application 140 does not include authorization (e.g., does not include an authorization cookie or an authorization token), the security service 120 can generate an authentication request for the identity provider 130 (the identity of which may be configured by the operator of the third-party application 140) and redirect the client device 110 to transmit the authentication to the identity provider 130. This authentication request may be a SAML AuthnRequest. The client device 110 receives this authentication request and transmits it to the identity provider 130. The client device 110 and the identity provider 130 then perform an authentication according to the rules and requirements at the identity provider 130. For instance, the user of the client device 110 may provide credentials (e.g., username/password) and may be required to perform multifactor authentication. If the user successfully authenticates to the identity provider 130, the identity provider 130 generates and transmits an authentication response to the client device 110 that includes the user identity and optionally other metadata about the user for the client device 110 to transmit to the security service 120. The authentication response message may be any type of protocol for communicating identity. For instance, the authentication response may be a SAML message, an OpenID connect (OIDC) message, or other protocol for sending identity.

To determine the device posture of the client device 110, the security service 120 accesses the endpoint protection provider (EPP) 135. For example, the security service 120 transmits a device posture request to the EPP 135 for the client device 110. The EPP 135 may be configured by the operator of the third-party application 140. The EPP 135 can determine the posture of the client device 110, which can include information such as patch status, management status, vulnerability score, etc. For instance, the EPP 135 can determine if the client device 110 is a healthy device and/or managed correctly as determined by configuration set at the EPP 135. The EPP 135 transmits a device posture response to the security service 120. The response may indicate whether the client device 110 satisfies their requirements or rules (e.g., whether the client device 110 is healthy and/or compliant). The EPP 135 may be a remote server or in some cases may be an agent that is executing on the client device 110.

As described previously, an access policy for the third-party application 140 may include an external evaluation rule. The external evaluation rule 125 may be configured and/or customized by the operator of the third-party application 140 and, when triggered, requests an access evaluation by an external server for the user and/or device. The external evaluation rule 125 defines an external endpoint (e.g., an external Application Programming Interface (API)) controlled or managed by the owner or operator of the third-party application. In the example of FIG. 1, the endpoint is represented by the external access policy API 145. The external evaluation rule 125 may also include a key or a reference to a key that can be used by the external endpoint to verify that the external evaluation request is coming from a trusted source. The external evaluation request may include information known about the following: the identity of the user associated with the access request, the device making the access request, the access request itself, a location of the device making the request, time of the access request, and/or other information. In an embodiment, the operator of the third-party application 140 may configure the information about the user, device, and/or request that is transmitted by the security service 120 in the external evaluation request.

The external access evaluation performed at the external access policy API 145 includes one or more external access rules 146 that are configured and/or customized by the operator of the third-party application 140. The external access rules 146 may be different from the access rules in the access policies 124. Example external access rules 146 include checking whether the requesting device is compliant according to an endpoint protection provider (which may be different from the EPP 135), checking whether the IP address used in the request is not on an external threat feed, checking whether the identified user is on a user database (e.g., is the user on a list of users that have completed cybersecurity training, checking for approval from another user of the organization, and/or checking whether the request is from a user authorized to access the application at the time of the request. An external access rule 146 enforced at the external access policy API 145 may rely on data that is not available to the security service 120. For example, working hours of a user may not be available at the security service 120 but may be available to the external access policy API 145. In such a case, an external access rule may specify times in which the user can access the third-party application 140 and/or times in which the user does not have permission to access the third-party application. After enforcing the one or more external access rules 146, the external access policy API 145 returns an external evaluation response to the security service 120. This response specifies whether the external access evaluation passed or failed.

If the external evaluation response specifies that the external access evaluation passed, and any other access policy is passed, the security service 120 grants access to the third-party application 140. Granting access to the third-party application 140 may include setting an authorization cookie or authorization token and redirecting the client device 110 retransmit the request with the authorization cookie or token. The security service 120 may then transmit the request to the third-party application 140. If the external evaluation response specifies that the external access evaluation failed, the security service 120 denies access to the third-party application 140 and may transmit a failure notification to the client device 110 in an embodiment. In another embodiment, if the external evaluation response specifies that the external access evaluation failed, the security service 120 takes one or more actions including allowing access to the third-party application 140 but in a remote browser isolation session, enforcing a set of one or more other access policies to determine whether access to the third-party application 140 will be allowed, and/or triggering a purpose justification or temporary authentication for the user to submit for allowing access to the third-party application 140.

Figure 2:
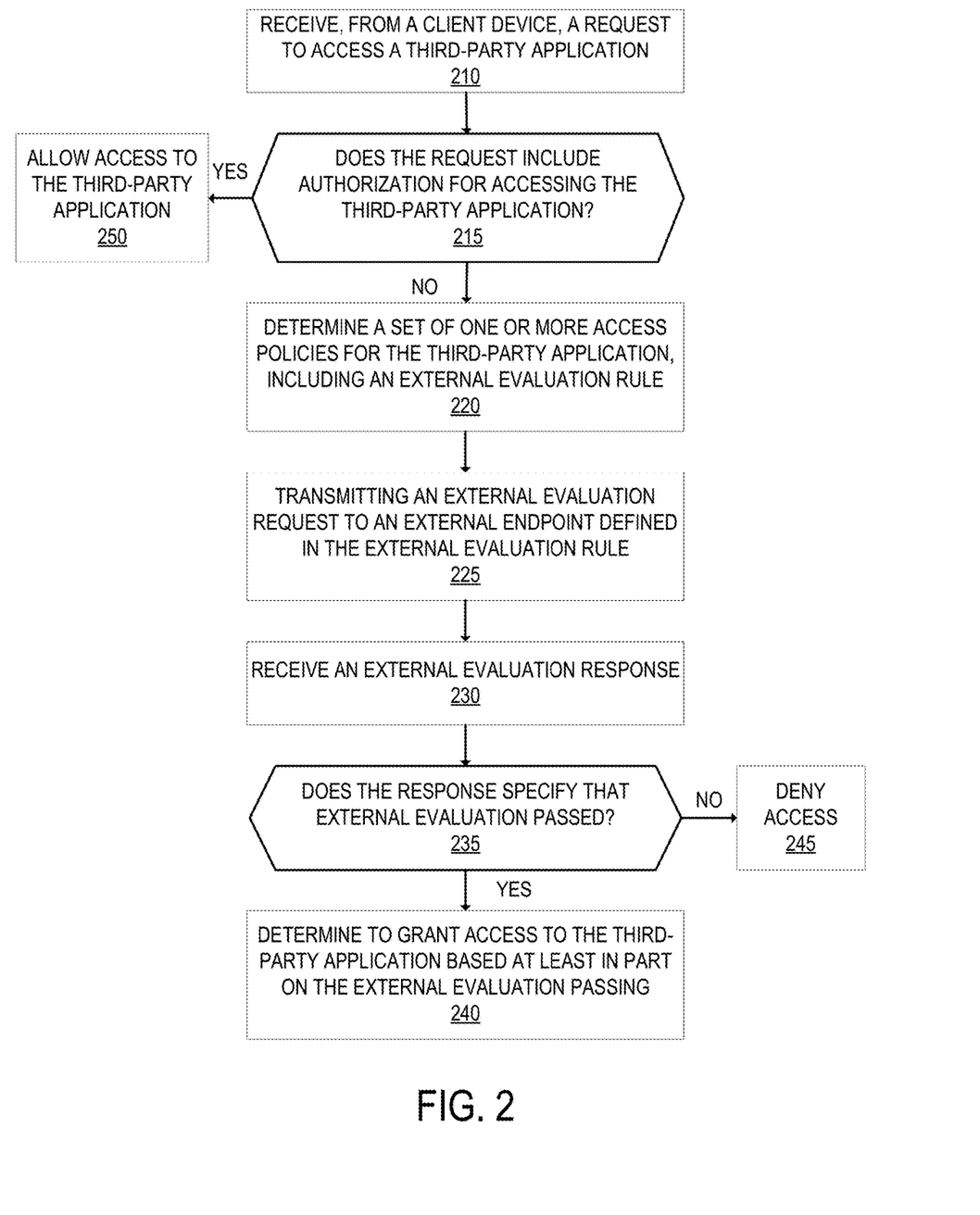
FIG. 2 is a flow diagram that illustrates exemplary operations for a cloud-based security service that includes external evaluation for accessing a third-party application according to an embodiment.

FIG. 2 is a flow diagram that illustrates exemplary operations for a cloud-based security service that includes external evaluation for accessing a third-party application according to an embodiment. The operations of FIG. 2 are described with respect to the exemplary embodiment of FIG. 1. However, the operations of FIG. 1 can be performed by embodiments different from FIG. 1, and the embodiment shown in FIG. 1 can perform operations different from that of FIG. 2.

At operation 210, the security service 120 receives, from the client device 110, a request to access a third-party application 140. The third-party application 140 is protected by the security service 120. For instance, the security service 120 executes the access policy enforcer 122 to enforce the set of access policies 124 that are configured for accessing the third-party application 140. If the set of access policies 124 are not met, the request is denied.

Next, at operation 215, the access policy enforcer 122 determines whether the request includes authorization for accessing the third-party application 140. For example, the access policy enforcer 122 determines whether a valid authorization cookie or authorization token is included in the request. If the request includes authorization for accessing the third-party application 140, then operation 250 is performed where the access policy enforcer 122 allows access to the third-party application 140. Allowing access may include transmitting the request to the third-party application 140. If the request does not include authorization for accessing the third-party application 140, operation 220 is performed.

At operation 220, the access policy enforcer 122 determines a set of one or more access policies 124 for the third-party application 140. The set of access policies 124 include an external evaluation rule 125. The external evaluation rule 125 defines an external endpoint (e.g., an external Application Programming Interface (API) such as the external access policy API 145) controlled or managed by the owner or operator of the third-party application 140. The external evaluation rule 125 may also include a key or a reference to a key that can be used by the external endpoint to verify that the external evaluation request is coming from a trusted source. The set of access policies 124 may also include identity-based access rules and/or non-identity based access rules.

The access policy enforcer 122 enforces the set of access policies 124 including the external evaluation rule 125. At operation 225, the access policy enforcer 122 causes an external evaluation request to be transmitted to the external endpoint defined in the external evaluation rule 125 (e.g., the external access policy API 145). The external evaluation request may include information known about the following: the identity of the user associated with the access request, the device making the access request, the access request itself, a location of the device making the request, time of the access request, and/or other information. In an embodiment, the operator of the third-party application 140 may configure the information about the user, device, and/or request that is transmitted by the security service 120 in the external evaluation request. The external evaluation request may take the form of an HTTP POST request that includes a JSON Web Token (JWT) that includes the payload of the request such as the identity of the user associated with the request, the device posture status, etc.

The external endpoint (e.g., the external access policy API 145) receives the external evaluation request and performs an access evaluation based on its access rules (e.g., the external access rules 146) that are configured and/or customized by the operator of the third-party application 140. The external access rules 146 may be different from the access rules in the access policies 124 of the security service 120. Example external access rules 146 include checking whether the requesting device is compliant according to an endpoint protection provider (which may be different from the EPP 135), checking whether the IP address used in the request is not on an external threat feed, checking whether the identified user is on a user database (e.g., is the user on a list of users that have completed cybersecurity training, checking for approval from another user of the organization, and/or checking whether the request is from a user authorized to access the application at the time of the request. An external access rule 146 enforced at the external access policy API 145 may rely on data that is not available to the security service 120. For example, working hours of a user may not be available at the security service 120 but may be available to the external access policy API 145. In such a case, an external access rule may specify times in which the user can access the third-party application 140 and/or times in which the user does not have permission to access the third-party application. After enforcing the one or more external access rules 146, the external access policy API 145 returns an external evaluation response to the security service 120. This response specifies whether the external access evaluation passed or failed.

At operation 230, the access policy enforcer 122 receives an external evaluation response from the external access policy API 145 that is responsive to the external evaluation request transmitted in operation 225. The response may be a HTTP response that includes a JWT that includes the payload of the response that indicates whether the external access evaluation passed or failed. At operation 235, the access policy enforcer 122 determines whether the received external evaluation response specified that the external evaluation passed. If the response does not, then operation 245 is performed where access to the application 140 is denied. Alternatively, if the external evaluation response specifies that the external access evaluation failed, the access policy enforcer 122 takes one or more actions including allowing access to the third-party application 140 but in a remote browser isolation session, enforcing a set of one or more other access policies to determine whether access to the third-party application 140 will be allowed, and/or triggering a purpose justification or temporary authentication for the user to submit for allowing access to the third-party application 140.

If the response specifies that the external evaluation passed, then operation 240 is performed where the access policy enforcer 122 determines to grant access to the third-party application 140 based at least in part on the external evaluation passing. Any other access rule on the security service 120 must also be met as a prerequisite for granting access to the third-party application 140. The access policy enforcer 122 may set an authorization cookie or authorization token for the client device 110 and cause the client device 110 to retransmit the request with this authorization cookie or token and redirecting the client device 110 retransmit the request with the authorization cookie or token.

In an embodiment, the security service 120 acts as a service provider on behalf of the third-party application and integrates with the identity provider 130 to provide identity and authentication. The security service 120 may initiate the flow of operations with the identity provider 130 to provide identity and authentication. For example, the operations may be an SP-initiated flow using Security Association Markup Language (SAML). Alternatively, the identity provider 130 may initiate the flow of operations with the service provider (the security service 120). For instance, the identity provider 130 may include the third-party application in a dashboard to which a user can select/login.

Figure 3:
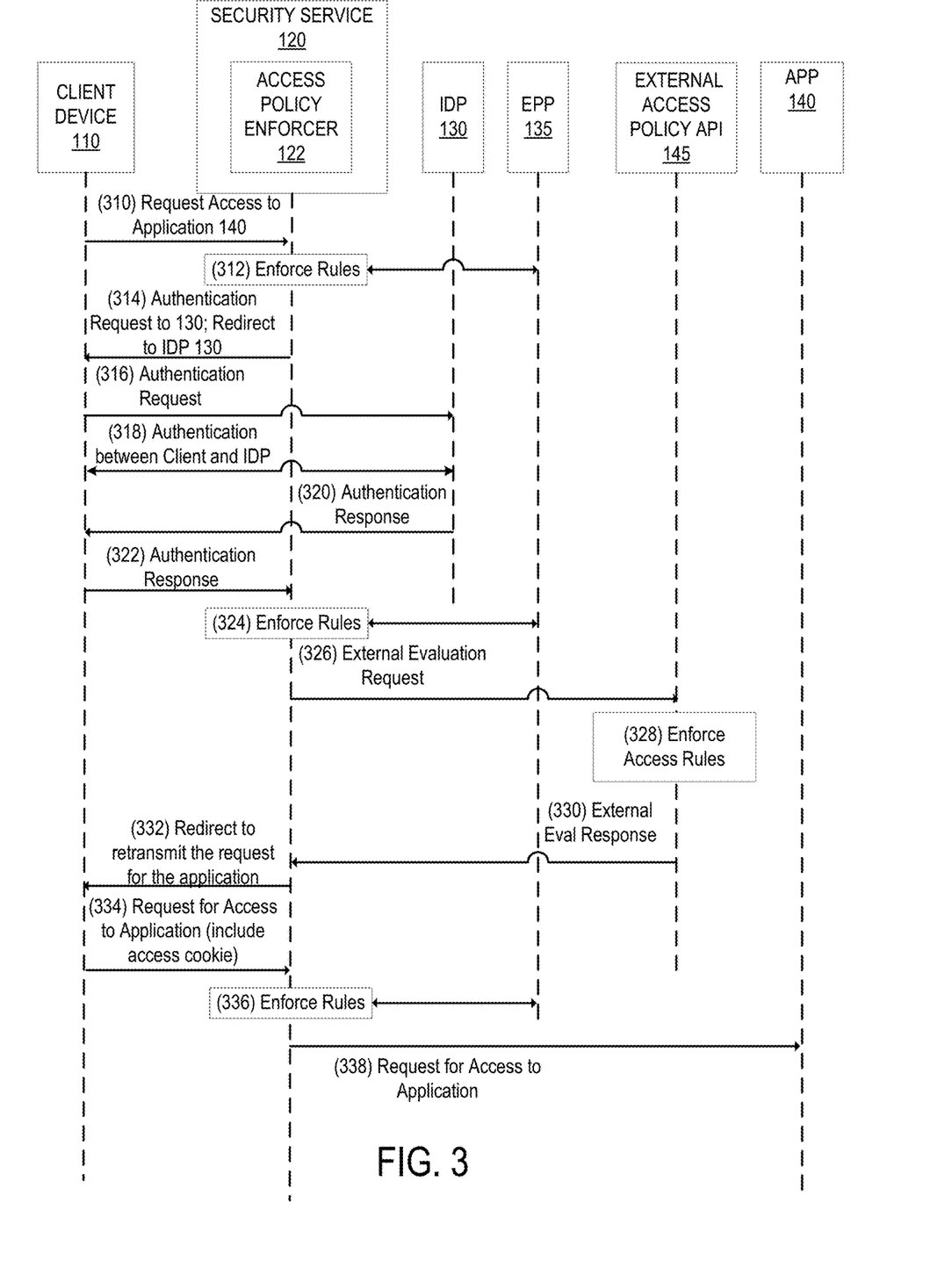
FIG. 3 is a sequence diagram that illustrates exemplary operations for a cloud-based security service that includes external evaluation for accessing a third-party according to an embodiment.

FIG. 3 is a sequence diagram that illustrates exemplary operations for a cloud-based security service that includes external evaluation for accessing a third-party according to an embodiment. The operations of FIG. 3 show an SP-initiated flow.

The access policy enforcer 122 of the security service 120 receives a request to access a third-party application 140 from the client device 110 at operation 310. The third-party application 140 is protected by the security service 120. For instance, the access policy enforcer 122 enforces the set of access policies 124 that are configured for accessing the third-party application 140. If the set of access policies 124 are not met, the request is denied. In the example of FIG. 3, the request does not include authorization for accessing the third-party application 140 (e.g., it does not include an authorization cookie or authorization token).

At operation 312, which is optional in some embodiments, the access policy enforcer 122 enforces a set of one or more access rules to determine whether to proceed with the access authorization flow. For instance, non-identity rule(s) may be configured that specify rules for accessing or not accessing the third-party application 140 such as rule(s) based on location, (e.g., geographic region such as the country of origin), device posture, time of request, type of request, IP address, multifactor authentication status, multifactor authentication type, type of device, type of client network application, and/or other layer 3, layer 4, and/or layer 7 policies. To determine device posture, for example, the access policy enforcer 122 accesses the EPP 135 to determine the posture of the client device 110. The access policy enforcer 122 may determine other parameters based on the request (e.g., IP address, location, time of request, type of request, type of device and/or client network application). If these access rules are not met, then the access authorization flow does not proceed. In the example of FIG. 3, these access rules are met in operation 312.

The security service 120 is the service provider and integrates with the IDP 130 for providing identity. At operation 314, the access policy enforcer 122 generates an authentication request for the identity provider 130 and redirects the client device 110 to transmit the authentication request to the identity provider 130. This authentication request may be a SAML AuthnRequest. The client device 110 receives this authentication request and transmits the authentication request to the identity provider 130 at operation 316.

The client device 110 and the identity provider 130 then perform an authentication according to the rules and requirements at the identity provider 130 at operation 318. For instance, the user of the client device 110 may provide credentials (e.g., username/password) and may be required to perform multifactor authentication. In the example of FIG. 3, the user has successfully authenticated to the identity provider 130. As a result, at operation 320, the identity provider 130 generates and transmits an authentication response to the client device 110 that includes the user identity and optionally other metadata about the user for the client device 110 to transmit to the access policy enforcer 122. The client device 110 transmits the authentication response to the access policy enforcer at operation 322. The authentication response message may be any type of protocol for communicating identity. For instance, the authentication response may be a SAML message, an OpenID connect (OIDC) message, or other protocol for sending identity.

The access policy enforcer 122 enforces one or more access rules at operation 324. The access rule(s) enforced at operation 324 include identity-based rules and/or non-identity based rules. The identity-based rule(s) are based on the identity of the user (e.g., provided by the IDP 130) such as a username, email address, etc., and may, for example, determine whether the identified user has access rights to access the third-party application 140. The non-identity rule(s) are not based on the identity of the user and may, for example, specify rules for accessing or not accessing the requested service. Examples include rules based on location (e.g., geographic region such as the country of origin), device posture, time of request, type of request, IP address, multifactor authentication status, multifactor authentication type, type of device, type of client network application, whether the request is associated with an agent on the client device, an external evaluation rule, and/or other layer 3, layer 4, and/or layer 7 policies.

In the example of FIG. 3, the access rules enforced at operation 324 include an external evaluation rule. The external evaluation rule defines an external endpoint (e.g., an external Application Programming Interface (API) such as the external access policy API 145) controlled or managed by the owner or operator of the third-party application 140. The external evaluation rule may also include a key or a reference to a key that can be used by the external endpoint to verify that the external evaluation request is coming from a trusted source. As part of enforcing the external evaluation rule, the access policy enforcer 122 causes the external evaluation request to be transmitted to the external endpoint defined in the external evaluation rule (e.g., the external access policy API 145) at operation 326. The external evaluation request may include information known about the following: the identity of the user associated with the access request, the device making the access request, the access request itself, a location of the device making the request, time of the access request, and/or other information. The external evaluation request may take the form of an HTTP POST request that includes a JSON Web Token (JWT) that includes the payload of the request such as the identity of the user associated with the request, the device posture status, etc.

The external endpoint (e.g., the external access policy API 145) receives the external evaluation request and performs an access evaluation based on its access rules (e.g., the external access rules 146) that are configured and/or customized by the operator of the third-party application 140 at operation 328. The external access rules 146 may be different from the access rules in the access policies 124 of the security service 120 as described previously. After enforcing the one or more external access rules 146, the external access policy API 145 returns an external evaluation response to the security service 120 at operation 330. This response specifies whether the external access evaluation passed or failed. The response may be a HTTP response that includes a JWT that includes the payload of the response that indicates whether the external access evaluation passed or failed.

If the external access evaluation response returned a failure (e.g., the request did not meet the criteria at the external access policy API 145), the access policy enforcer 122 denies the request in an embodiment. In another embodiment, if the external evaluation response returns a failure, the access policy enforcer takes one or more actions including allowing access to the third-party application 140 but in a remote browser isolation session, enforcing a set of one or more other access policies to determine whether access to the third-party application 140 will be allowed, and/or triggering a purpose justification or temporary authentication for the user to submit for allowing access to the third-party application 140. If the external access evaluation response indicates the external access evaluation was successful, and if any other access rule is also passed, the access policy enforcer 122 determines to grant access to the application. Granting access to the third-party application 140 includes setting an authorization cookie or token and redirecting the client device 110 to retransmit the request for the third-party application 140 with the authorization cookie or token. In the example of FIG. 3, the external access evaluation response indicates the external access evaluation was successful. Thus, at operation 332, the access policy enforcer 122 redirects the client device 110 to retransmit the request for the application 140 with the authorization cookie or token. The client device 110 retransmits the request for the application, including the authorization cookie or token, at operation 334. This request is again received at the access policy enforcer 122.

At operation 336, which is optional in some embodiments, the access policy enforcer 122 enforces a set of one or more access rules to determine whether to proceed with the access authorization flow. The access rules may be identity based and/or non-identity based as previously described. Enforcing the access rules may include determining the device posture of the client device 110 by accessing the EPP 135 as previously described. At operation 338, the access policy enforcer 122 transmits the request to the third-party application 140.

Figure 4:
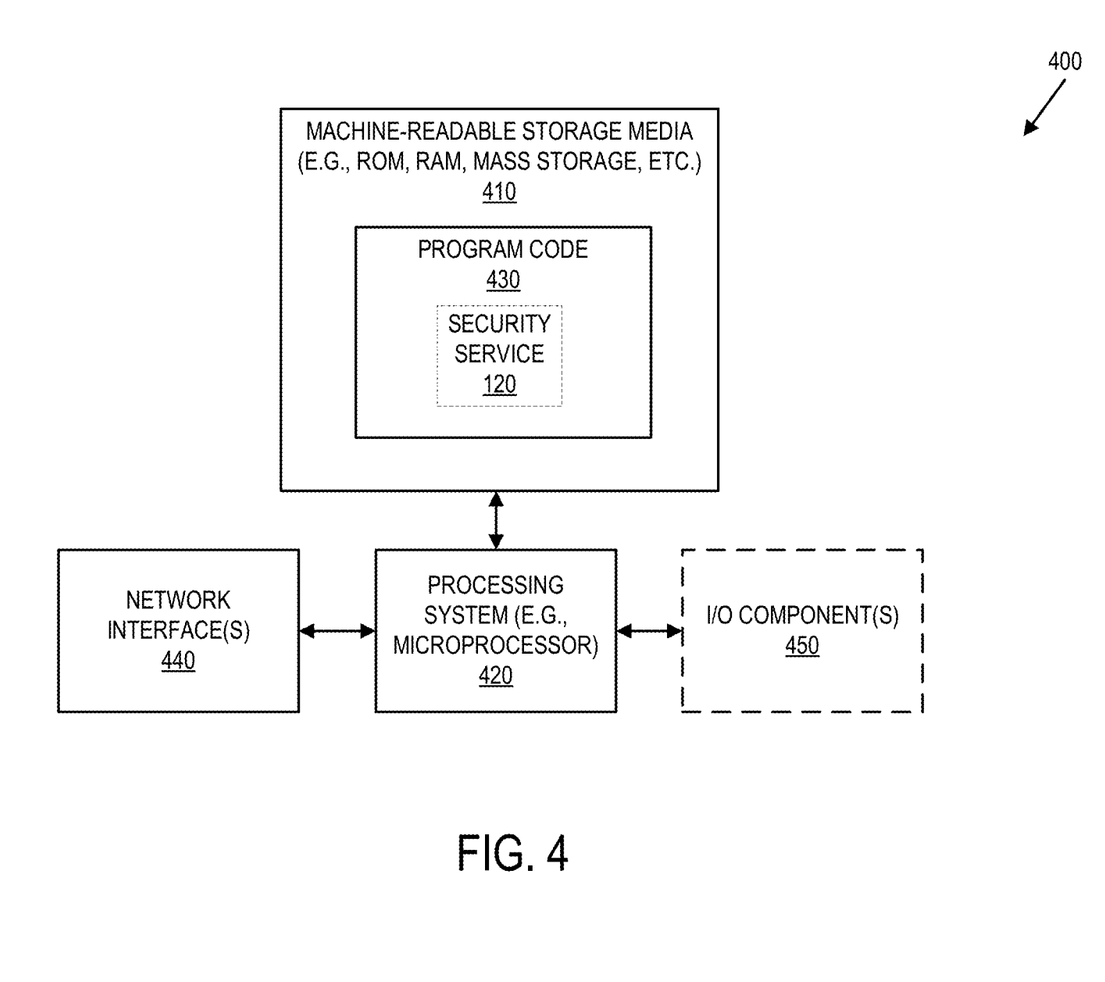
FIG. 4 is a block diagram illustrating a data processing system that can be used in an embodiment.

FIG. 4 illustrates a block diagram for an exemplary data processing system 400 that may be used in some embodiments. One or more such data processing systems 400 may be utilized to implement the embodiments and operations described with respect to the client device 110 and the server 118. Data processing system 400 includes a processing system 420 (e.g., one or more processors and connected system components such as multiple connected chips).

The data processing system 400 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 410 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 420. For example, the depicted machine-readable storage media 410 may store program code 430 that, when executed by the processor(s) 420, causes the data processing system 400 to execute the security service 120 including the access policy enforcer 122, and/or any of the operations described herein.

The data processing system 400 also includes one or more network interfaces 440 (e.g., a wired and/or wireless interfaces) that allows the data processing system 400 to transmit data and receive data from other computing devices, typically across one or more networks (e.g., Local Area Networks (LANs), the Internet, etc.). The data processing system 400 may also include one or more input or output ("I/O") components 450 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 400, and, in certain embodiments, fewer components than that shown in One or more buses may be used to interconnect the various components shown in FIG. 4.

The techniques shown in the figures can be implemented using code and data stored and executed on one or more electronic devices (e.g., a client device, a server implementing the security service 120, etc.). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth to provide a more thorough understanding. In other instances, control structures, gate level circuits and full software instruction sequences have not been shown in detail in order not to obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a server providing a cloud-based security service, comprising:
   receiving, from a client device at the cloud-based security service, a request to access a third-party application;
   determining an identity of a user associated with the request;
   determining, at the cloud-based security service, a set of one or more access policies that are configured for accessing the third-party application, wherein the set of one or more access policies includes:
     an identity-based access rule that specifies criteria the identity of the user associated with the request must meet to satisfy the identity-based access rule, and
     an external evaluation rule;
   enforcing the identity-based access rule including determining that the identity of the user associated with the request meets the specified criteria;
   enforcing the external evaluation rule including transmitting an external evaluation request to an external endpoint defined in the external evaluation rule, wherein the external endpoint is external to the cloud-based security service and is controlled or managed by an owner or operator of the third-party application, and wherein the external evaluation request includes an identity of a user associated with the request;
   receiving, from the external endpoint defined in the external evaluation rule, an external evaluation response that is responsive to the external evaluation request, the external evaluation response specifying that an external evaluation has passed; and
   granting access to the third-party application based at least in part on receiving the external evaluation response specifying that the external evaluation has passed.

2. The method of claim 1, wherein granting access to the third-party application includes transmitting the request to the third-party application.

3. The method of claim 1, further comprising:
wherein granting access to the third-party application includes setting an authorization cookie or token and redirecting the client device to transmit the request again with the authorization cookie or token; and
transmitting the request to the third-party application.

4. The method of claim 1, wherein determining the identity of the user associated with the request includes:
causing the client device to transmit an authentication request to an identity provider; and
receiving, from the client device, an authentication response that was generated by the identity provider that identifies the user and signifies the user has successfully authenticated to the identity provider.

5. The method of claim 1, further comprising:
wherein the set of one or more access policies further includes a device posture rule that specifies criteria related to device posture in which the client device must meet for satisfying the device posture rule; and
enforcing the device posture rule including:
transmitting a request for device posture status of the client device to an endpoint protection provider,
receiving a response to the request for device posture status of the client device from the endpoint protection provider, and
determining that the device posture status of the client device meets the specified criteria in the device posture rule.

6. The method of claim 1, wherein the cloud-based security service acts as a service provider on behalf of the third-party application.

7. A non-transitory machine-readable storage medium that provides instructions that, if executed by a processor of a server providing a cloud-based security service, will cause said processor to perform operations comprising:
receiving, from a client device at the cloud-based security service, a request to access a third-party application;
determining an identity of a user associated with the request;
determining, at the cloud-based security service, a set of one or more access policies that are configured for accessing the third-party application, wherein the set of one or more access policies includes:
an identity-based access rule that specifies criteria the identity of the user associated with the request must meet to satisfy the identity-based access rule, and
an external evaluation rule;
enforcing the identity-based access rule including determining that the identity of the user associated with the request meets the specified criteria;
enforcing the external evaluation rule including transmitting an external evaluation request to an external endpoint defined in the external evaluation rule, wherein the external endpoint is external to the cloud-based security service and is controlled or managed by an owner or operator of the third-party application, and wherein the external evaluation request includes an identity of a user associated with the request;
receiving, from the external endpoint defined in the external evaluation rule, an external evaluation response that is responsive to the external evaluation request, the external evaluation response specifying that an external evaluation has passed; and
granting access to the third-party application based at least in part on receiving the external evaluation response specifying that the external evaluation has passed.

8. The non-transitory machine-readable storage medium of claim 7, wherein granting access to the third-party application includes transmitting the request to the third-party application.

9. The non-transitory machine-readable storage medium of claim 7, wherein the operations further comprise:
wherein granting access to the third-party application includes setting an authorization cookie or token and redirecting the client device to transmit the request again with the authorization cookie or token; and
transmitting the request to the third-party application.

10. The non-transitory machine-readable storage medium of claim 7, wherein determining the identity of the user associated with the request includes:
causing the client device to transmit an authentication request to an identity provider; and
receiving, from the client device, an authentication response that was generated by the identity provider that identifies the user and signifies the user has successfully authenticated to the identity provider.

11. The non-transitory machine-readable storage medium of claim 7, wherein the operations further comprise:
wherein the set of one or more access policies further includes a device posture rule that specifies criteria related to device posture in which the client device must meet for satisfying the device posture rule; and
enforcing the device posture rule including:
transmitting a request for device posture status of the client device to an endpoint protection provider,
receiving a response to the request for device posture status of the client device from the endpoint protection provider, and
determining that the device posture status of the client device meets the specified criteria in the device posture rule.

12. The non-transitory machine-readable storage medium of claim 7, wherein the cloud-based security service acts as a service provider on behalf of the third-party application.

13. A server providing a cloud-based security service, the server comprising:
a processor; and
a non-transitory machine-readable storage medium that provides instructions that, if executed by the processor, will cause the server to perform operations including:
receiving, from a client device at the cloud-based security service, a request to access a third-party application;
determining an identity of a user associated with the request;
determining, at the cloud-based security service, a set of one or more access policies that are configured for accessing the third-party application, wherein the set of one or more access policies includes:
an identity-based access rule that specifies criteria the identity of the user associated with the request must meet to satisfy the identity-based access rule, and
an external evaluation rule;
enforcing the identity-based access rule including determining that the identity of the user associated with the request meets the specified criteria;
enforcing the external evaluation rule including transmitting an external evaluation request to an external endpoint defined in the external evaluation rule, wherein the external endpoint is external to the cloud-based security service and is controlled or managed by an owner or operator of the third-party application, and wherein the external evaluation request includes an identity of a user associated with the request;

receiving, from the external endpoint defined in the external evaluation rule, an external evaluation response that is responsive to the external evaluation request, the external evaluation response specifying that an external evaluation has passed; and granting access to the third-party application based at least in part on receiving the external evaluation response specifying that the external evaluation has passed.

14. The server of claim 13, wherein granting access to the third-party application includes transmitting the request to the third-party application.

15. The server of claim 13, wherein the operations further comprise:

wherein granting access to the third-party application includes setting an authorization cookie or token and redirecting the client device to transmit the request again with the authorization cookie or token; and transmitting the request to the third-party application.

16. The server of claim 13, wherein determining the identity of the user associated with the request includes:

causing the client device to transmit an authentication request to an identity provider; and receiving, from the client device, an authentication response that was generated by the identity provider that identifies the user and signifies the user has successfully authenticated to the identity provider.

17. The server of claim 15, wherein the operations further comprise:

wherein the set of one or more access policies further includes a device posture rule that specifies criteria related to device posture in which the client device must meet for satisfying the device posture rule; and enforcing the device posture rule including:

transmitting a request for device posture status of the client device to an endpoint protection provider, receiving a response to the request for device posture status of the client device from the endpoint protection provider, and determining that the device posture status of the client device meets the specified criteria in the device posture rule.

* * * * *